United States Patent [19]

Tsushima et al.

[11] Patent Number: 5,140,453
[45] Date of Patent: Aug. 18, 1992

[54] OPTICAL RECEIVING METHOD UTILIZING POLARIZATION DIVERSITY AND APPARATUS FOR CARRYING OUT THE SAME

[75] Inventors: Hideaki Tsushima, Hachioji; Katsuyuki Imoto, Sayama; Hirohisa Sano, Kokubunji; Akihiko Takase, Tokyo; Yoshitaka Takasaki, Tokorozawa; Minoru Maeda, Nishitama, all of Japan

[73] Assignee: Hitachi, Ltd., Tokyo, Japan

[21] Appl. No.: 166,984

[22] Filed: Mar. 11, 1988

[30] Foreign Application Priority Data

Mar. 13, 1987 [JP] Japan .................................. 62-56503
Mar. 13, 1987 [JP] Japan .................................. 62-56510

[51] Int. Cl.$^5$ ........................................... H04B 10/06
[52] U.S. Cl. .................................................... 359/192
[58] Field of Search ............... 455/616, 619, 606, 607, 455/612, 617, 600, 609-611

[56] References Cited

U.S. PATENT DOCUMENTS 4,506,388  3/1985  Monerie ................................ 455/616
4,718,120  1/1988  Tzeng .................................... 455/619
4,723,316  2/1988  Glance ................................... 455/619

OTHER PUBLICATIONS

Fourth International Conference on Optical Fiber Communication, Technical Digest, Jun. 30, 1983, "Polarization Diversity Receiver", Okoshi et al.
Report of Institute of Electronics, Aug. 27, 1986 pp. 25-27 "Optical Polarization Automatic Control System for Optical Coherent Transmission", Yoshida et al.
Journal of Lightwave Technology, vol. LT-5, No. 2, Feb. 1987 "Polarization Independent Coherent Optical Receiver", Glance.
Hodgkinson, "Demodulation of Optical DPSK Using In Phase and Quadrature Detection", *Electronic Letters*, vol. 21, pp. 867-868, Sep. 12, 1985.

Primary Examiner—Edward L. Coles, Sr.
Assistant Examiner—L. Pascal
Attorney, Agent, or Firm—Antonelli, Terry, Stout & Kraus

[57] ABSTRACT

An optical receiving method utilizing polarization diversity is disclosed in which first and second reference lightwaves having different frequencies and having polarization planes substantially perpendicular to each other, are combined with a signal lightwave to form a combined lightwave. The combined lightwave is subjected to heterodyne detection to obtain a detection signal and the detection signal is separated into first and second intermediate-frequency signals having different carrier frequencies. The first and second intermediate-frequency signals are converted into first and second baseband signals, respectively, and the first and second baseband signals are added to obtain an output signal.

13 Claims, 10 Drawing Sheets

OPTICAL RECEIVING METHOD UTILIZING POLARIZATION DIVERSITY AND APPARATUS FOR CARRYING OUT THE SAME

BACKGROUND OF THE INVENTION

The present invention relates to an optical receiving method in which polarization diversity is utilized and a signal lightwave is subjected to heterodyne detection, and an apparatus for carrying out the method. More particularly, the present invention relates to an optical receiving method utilizing polarization diversity (hereinafter referred to as "polarization-diversity optical receiving method"), suitable for realizing an optical receiving apparatus which is high in sensitivity, low in manufacturing cost, and small in size.

In coherent optical transmission in which information is transmitted by utilizing the wave motion of light, there arises a problem that variations in the polarization state of a signal lightwave causes a reduction in signal-to-noise ratio of a received signal. In order to solve this problem, various counterplans have been considered. For example, a polarization-diversity optical receiving method and an apparatus for carrying out this method have been proposed. According to the polarization-diversity optical receiving method, a reduction in power of a received signal due to variations in the polarization state of the signal lightwave is suppressed to prevent a reduction in signal-to-noise ratio of the received signal.

A conventional polarization-diversity optical receiving method and an apparatus for carrying out the conventional method have been discussed in, for example, a paper entitled "POLARIZATION-DIVERSITY RECEIVER FOR HETERODYNE/COHERENT OPTICAL FIBER COMMUNICATIONS" by OKOSHI et al. (the technical digest of the fourth international conference on integrated optics and optical fiber communication held on Jun. 27 to 30, 1983).

In the above method and apparatus, signal lightwave is separated by a polarization separator such as a polarization beam splitter into two polarization components whose polarization planes are perpendicular to each other, and the polarized optical components are combined with two reference lightwaves having the same frequency. Further, two combined lightwaves thus obtained are received by different receivers, and subjected to heterodyne detection, to obtain two detection signals. The detection signals are added to each other, to form an output signal. As a result, even in a case where the polarization state of the signal lightwave is changed so that the signal lightwave becomes linearly-polarized lightwave, and the lightwave component incident on one of the receivers becomes zero, the whole of the linearly-polarized signal lightwave is incident upon the other receiver, and thus the power of received signal is never reduced to zero. That is, it is possible to suppress a reduction in the signal-to-noise ratio of a received signal due to variations in the polarization state of the signal lightwave.

The above method and apparatus, however, have the following drawbacks. That is, part of the signal lightwave is reflected from the polarization separator, and thus the intensity of the signal lightwave incident upon each receiver is lowered. As a result, the sensitivity of an optical receiving apparatus is reduced. Further, owing to the intensity loss at the polarization separator, the signal lightwave is attenuated when the signal lightwave passes through the polarization separator. Thus, the intensity of the signal lightwave incident on each receiver is lowered, and the sensitivity of the optical receiving apparatus is reduced. Further, two optical couplers are required for forming two combined lightwaves. This increases the manufacturing cost of the optical receiving apparatus. In order for each combined lightwave to be subjected to heterodyne detection, the optical receiving apparatus is required to include a pair of receivers; a pair of electric circuits, each of which is connected to a corresponding one of the receivers and includes a power source; an amplifier; and a pair of optical elements such as lenses. Thus, the manufacturing cost of the optical receiving apparatus is increased. Since the optical receiving apparatus includes a pair of receivers and electric circuits, the power consumption of the optical receiving apparatus is increased, and hence the operating cost thereof becomes high. Since the optical receiving apparatus is high in power consumption, an expense necessary for cooling the apparatus is increased. Further, in order to make the characteristics of two receivers substantially equal to each other, it is necessary to select two receivers having the same characteristics from a multiplicity of receivers. Thus, the manufacturing cost of the optical receiving apparatus is increased.

SUMMARY OF THE INVENTION

It is an object of the present invention to provide a polarization-diversity optical receiving method which can solve the above problems of the prior art, and to provide an apparatus which can carry out the above method and is high in sensitivity, low in manufacturing cost and small in size.

In order to attain the above object, according to an aspect of the present invention, two reference lightwave which have different frequencies and whose polarization planes are substantially perpendicular to each other, are combined with a signal lightwave, to form a combined lightwave. The combined lightwave is subjected to heterodyne detection to obtain a detection signal, which is separated into first and second intermediate-frequency signals having different carrier frequencies. The first and second intermediate-frequency signals are converted into first and second baseband signals, respectively. The base-band signals are added to each other, to obtain a desired signal.

When signal light is combined with a reference lightwave having a frequency different from the carrier frequency of the signal lightwave, and the combined lightwave is incident on a receiver to be subjected to heterodyne detection, the receiver delivers an intermediate-frequency signal having a carrier frequency equal to the difference between the carrier frequency of the signal lightwave and the frequency of the reference lightwave. In this case, the power of the intermediate-frequency signal is proportional to the intensity of that polarization component of the signal lightwave which has the polarization plane parallel to the polarization plane of the reference lightwave. That is, when the polarization state of the signal lightwave varies and thus the intensity of that polarization component of the signal lightwave which has the polarization plane parallel to the polarization plane of the reference lightwave, is varied, the power of the intermediate-frequency signal varies linearly with the intensity of the above polarization component. The minimum value of the power of the intermediate-frequency signal is equal to zero. In a case where the polarization plane of a linearly-polarized signal lightwave is perpendicular to the polarization plane of linearly-polarized reference lightwave, the power of the intermediate-frequency signal becomes equal to zero.

According to the present invention, the receiver delivers the sum of two intermediate-frequency signals which are different in carrier frequency from each other. This is because the reference lightwave contains two reference lightwave components having different frequencies. The power of each of two intermediate-frequency signals is proportional to the intensity of a corresponding one of two polarization components of the signal lightwave which have polarization planes perpendicular to each other. This is because the polarization planes of two reference lightwave components are substantially perpendicular to each other. Accordingly, one of the intermediate-frequency signals is obtained from one reference lightwave component and that polarization component of the signal lightwave which has the polarization plane parallel to that of the one reference lightwave component. The other intermediate-frequency signal is obtained from the other reference lightwave component and the remaining polarization component of the signal lightwave. Hence, no matter how the polarization state of the signal lightwave may vary, the total power of two intermediate-frequency signals is never reduced to zero.

Further, two intermediate-frequency signals are different in carrier frequency from each other, and hence can be separated from each other by a filter. After having been separated, the intermediate-frequency signals are converted into baseband signals, which are added to each other to form a single output signal. No matter how the polarization state of the signal lightwave may vary, the power of the output signal will not be reduced to zero. That is, a reduction in signal-to-noise ratio of the output signal can be suppressed. It is to be noted that the above effect is obtained by using a single receiver, and moreover it is not required to use a polarization separator.

Further, in order to attain the object of the present invention, according to another aspect of the present invention, a signal lightwave is separated into two polarization components whose polarization planes are perpendicular to each other, and the polarization components are combined with a reference lightwave in a state that the polarization planes of the polarization components are both made parallel to the polarization plane of the reference lightwave, to form a combined lightwave. The combined lightwave thus-obtained is subjected to heterodyne detection or homodyne detection, to obtain a demodulated signal. In this case, a polarization separator is used for separating the signal lightwave into two polarization components whose polarization planes are substantially perpendicular to each other. Two polarization components from the polarization separator are combined with an undivided reference light-wave, after the polarization planes of the polarization components have been made parallel to the polarization plane of the reference lightwave. The combined lightwave is subjected to heterodyne or homodyne detection, to obtain a demodulated signal. As mentioned above, the demodulated signal is derived from the combined light, which contains two polarization components of the signal lightwave in a state that the polarization planes of the polarization components are made parallel to each other. However, the polarization planes of the polarization components of the signal lightwave are originally perpendicular to each other. Accordingly, no matter how the polarization state of the signal lightwave may vary, it never occurs that the intensities of the two polarization components of the signal lightwave are simultaneously reduced to zero. In other words, the intensity of signal lightwave contained in the combined light is never reduced to zero, and thus the demodulated signal is always formed. The demodulated signal can be obtained for any polarization state of signal lightwave. It is to be noted that the demodulated signal is efficiently produced as a difference in phase between the two polarization components combined with the reference lightwave.

DESCRIPTION OF THE PREFERRED EMBODIMENTS

Figure 1:
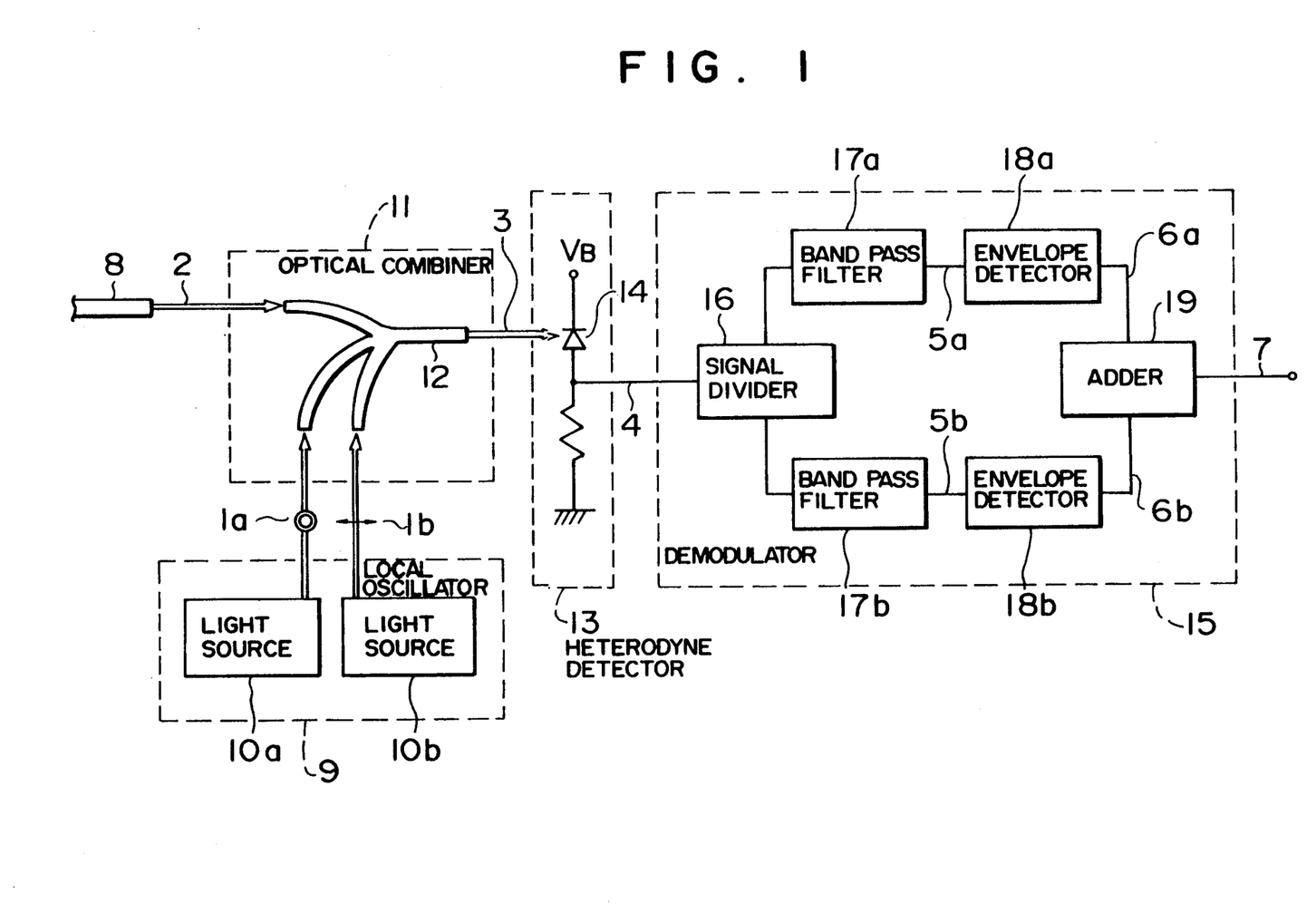
FIG. 1 is a block diagram showing an embodiment of an optical receiving apparatus utilizing polarization diversity (hereinafter referred to as "polarization-diversity optical receiving apparatus") according to the present invention.

FIG. 1 shows an embodiment of a polarization-diversity optical receiving apparatus according to the present invention. In FIG. 1, reference symbols $1a$ and $1b$ designate reference lightwaves which are different in frequency from each other and have polarization planes substantially perpendicular to each other, 2 a signal lightwave, 3 a combined lightwave obtained by combining the reference lightwave $1a$ and $1b$ with the signal lightwave 2, 4 a detection signal which is obtained by carrying out heterodyne detection for the combined lightwave 3, $5a$ and $5b$ intermediate-frequency signals which are extracted from the detection signal 4 and are different in carrier frequency from each other, $6a$ and $6b$ baseband signals obtained from the intermediate-frequency signals $5a$ and $5b$, 7 an output signal obtained by adding the baseband signals $6a$ and $6b$, 8 an optical fiber for transmitting the signal lightwave 2, 9 a local oscillator for emitting the reference lightwaves $1a$ and $1b$, and $10a$ and $10b$ light sources included in the local oscillator 9. Each of the light sources $10a$ and $10b$ can be formed of a laser having a single oscillation mode. For example, in a case where semiconductor lasers are used as the light sources 10a and 10b, the semiconductor lasers are disposed so that the PN junction planes of the semiconductor lasers are perpendicular to each other, to make the polarization planes of the reference lightwave 1a and 1b substantially perpendicular to each other. Further, in FIG. 1, reference numeral 11 designates an optical combiner for combining the reference lightwaves 1a and 1b and the signal lightwave 2 to obtain the combined lightwave 3, 12 an optical-coupler made up of single-mode optical fibers or a directional coupler for forming the optical combiner 11, 13 a heterodyne detector, 14 an optical detector formed of a PIN photodiode or avalanche photodiode for carrying out heterodyne detection for the combined lightwave 3 (it is to be noted that reference symbol $V_B$ denotes a voltage applied to the optical detector 14), 15 a demodulator for demodulating the detection signal 4 to obtain an output signal 7, 16 a signal divider for dividing the detection signal 4 into two parts, 17a a bandpass filter for transmitting only the intermediate-frequency signal 5a which is obtained from the signal lightwave 2 and the reference lightwave 1a, 17b a band pass filter for transmitting only the intermediate-frequency signal 5b which is obtained from the signal lightwave 2 and the reference lightwave 1b, 18a an envelope detector for converting the intermediate-frequency signal 5a into the baseband signal 6a, 18b an enveloped detector for converting the intermediate-frequency signal 5b into the baseband signal 6b, and 19 an adder for adding the baseband signals 6a and 6b.

Figure 2A:
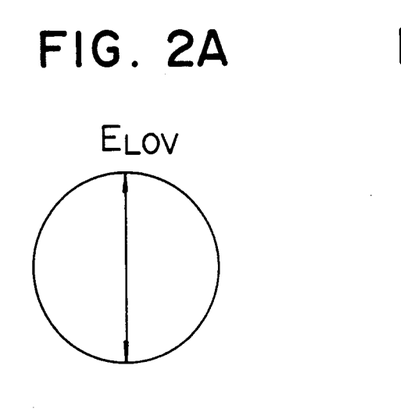
FIGS. 2A to 2E are schematic diagrams showing polarization states of a lightwave at various parts of the embodiment of FIG. 1.
Figure 2B:
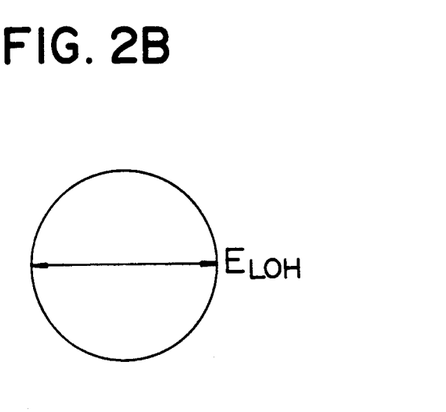
Figure 2C:
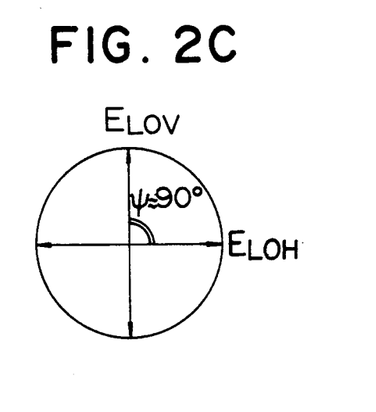
Figure 2D:
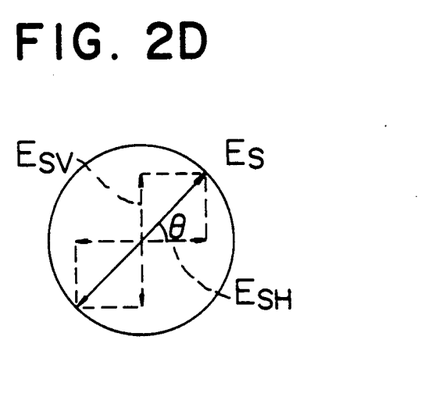

The operation of the present embodiment will be explained below, with reference to FIGS. 2A to 2E and 3A to 3C. FIGS. 2A to 2E show the polarization states of a lightwave at various parts of the present embodiment, and FIGS. 3A to 3B show the frequency spectra of the lightwave at a few locations of the present embodiment. In more detail, FIG. 2A shows the polarization plane of the reference lightwave 1a, and reference symbol $E_{LOV}$ designates the amplitude of electric field of the reference lightwave 1a. FIG. 2B shows the polarization plane of the reference lightwave 1b, and reference symbol $E_{LOH}$ designates the amplitude of electric field of the reference lightwave 1b. Since the polarization plane of the reference lightwave 1a is substantially perpendicular to that of the reference lightwave 1b, the positional relation between the polarization planes of the reference lightwaves 1a and 1b can be expressed by FIG. 2C.

Now, let us consider a case where the signal lightwave 2 is a linearly-polarized lightwave, by way of example. FIG. 2D shows the polarization plane of the signal lightwave 2. In FIG. 2D, reference symbol $E_S$ designates the amplitude of electric field of the signal lightwave 2, and $E_{SV}$ and $E_{SH}$ those components of the amplitude $E_S$ which are parallel to the electric fields having the amplitude $E_{LOV}$ and $E_{LOH}$. When an angle between $E_{SH}$ and $E_S$ is expressed by $\theta$, the polarization state of the signal lightwave 2 is indicated by the following equations:

$$E_{SV} = E_S \cdot \sin\theta \tag{1}$$

$$E_{SH} = E_S \cdot \cos\theta$$

where $0 \leq \theta \leq 90°$

Figure 2E:
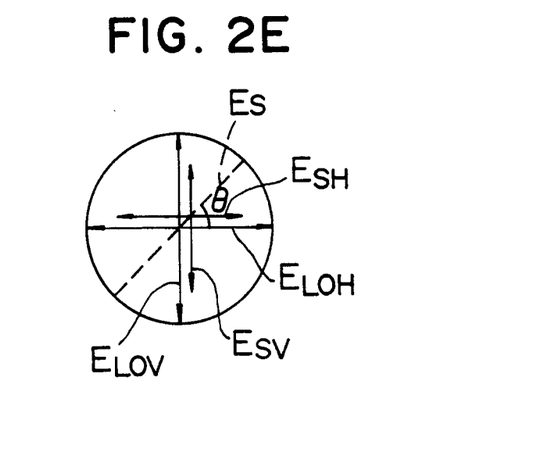
Figure 3A:
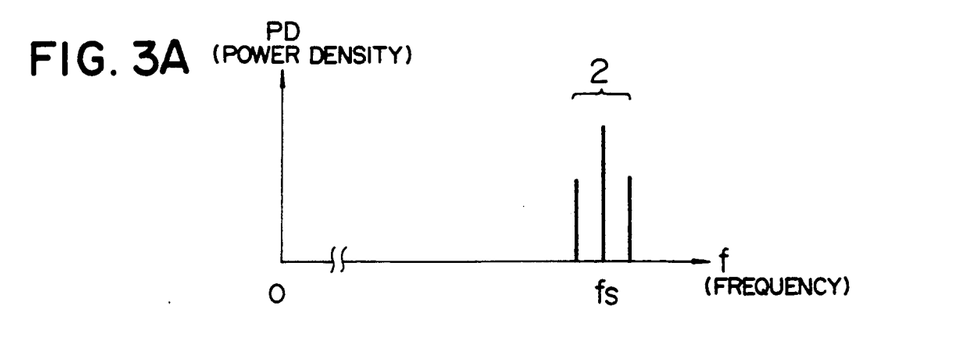
FIGS. 3A to 3C are schematic diagrams showing frequency spectra of light at a few parts of the embodiment of FIG. 1.
Figure 3B:
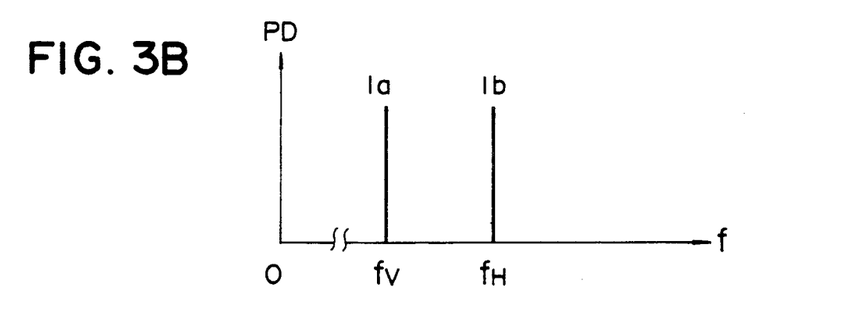

FIG. 2E shows the polarization plane of the combined lightwave 3. As shown in FIG. 2E, the components $E_{SV}$ and $E_{SH}$ are parallel to the electric fields having the amplitude $E_{LOV}$ and $E_{LOH}$, respectively. Hence, the detection signal I(t) delivered from the optical detector 14 which receives the combined lightwave 3, is given by the following equation:

$$I(t) = I_a(t) + I_b(t) \tag{2}$$

where $$I_a(t) = D \cdot E_{SV} \cdot E_{LOV} \cdot \cos[2\pi(f_S - f_V) + \delta_a]$$

$$I_b(t) = D \cdot E_{SH} \cdot E_{LOH} \cdot \cos[2\pi(f_S - f_H) + \delta_b]$$

Figure 3C:
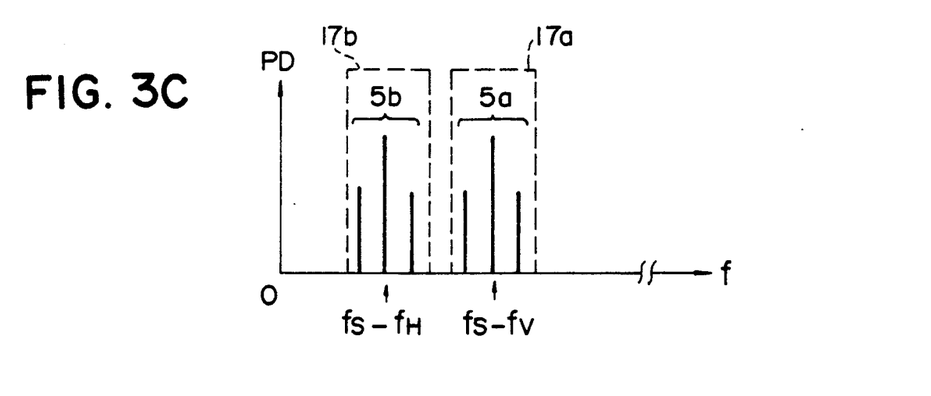

Further, in the equation (2), symbol D indicates a constant dependent upon the optical receiver, $f_V$ the frequency of the reference lightwave 1a, $f_H$ the frequency of the reference lightwave 1b, $f_S$ the carrier frequency of the signal lightwave 2, $\delta_a$ a phase difference, $\delta_b$ a phase difference, $I_a(t)$ an intermediate-frequency signal which is obtained from the reference lightwave 1a and the signal lightwave 2 and has a carrier frequency equal to $(f_S - f_V)$, and $I_b(t)$ an intermediate-frequency signal which is obtained from the reference lightwave 1b and the signal lightwave 2 and has a carrier frequency equal to $(f_S - f_H)$. Accordingly, the equation (2) indicates that the detection signal I(t) is expressed by the sum of two intermediate-frequency signals $I_a(t)$ and $I_b(t)$. FIG. 3A shows the carrier frequency $f_S$ of the signal lightwave 2, and FIG. 3B shows the frequencies $f_V$ and $f_S$ of the reference lightwaves 1a and 1b. Further, FIG. 3C shows the frequency spectrum of the detection signal I(t). In FIG. 3C, a right block bounded by broken lines indicates the frequency spectrum of the intermediate-frequency signal $I_a(t)$, and a left block bounded by broken lines indicates the frequency spectrum of the intermediate-frequency signal $I_b(t)$.

When the detection signal 4 is separated by the signal divider 16 into two parts, and these parts are applied to the band pass filters 17a and 17b having pass bands, each of which is indicated by a pair of broken lines in FIG. 3C, the filters 17a and 17b deliver the intermediate-frequency signals $I_a(t)$ and $I_b(t)$, respectively. The signals $I_a(t)$ and $I_b(t)$ are applied to the envelope detectors 18a and 18b, respectively, to be converted into baseband signals. The amplitude of each baseband signal is given by the following equations:

$$\left. \begin{array}{l} I_a'(t) = D \cdot E_{SV} \cdot E_{LOV} = D \cdot E_S \cdot E_{LOV} \cdot \sin\theta \\ I_b'(t) = D \cdot E_{SH} \cdot E_{LOH} = D \cdot E_S \cdot E_{LOH} \cdot \cos\theta \end{array} \right\} \tag{3}$$

When the above-mentioned $I_a'(t)$ and $I_b'(t)$ are added by the adder 19, the output signal 7 from the adder 19 is given by the following equation:

$$I'(t) = I_a'(t) + I_b'(t) = D \cdot E_S(E_{LOV}\sin\theta + E_{LOH}\cos\theta) \tag{4}$$

As can be seen from the equation (4), the output signal 7 of the present embodiment does not become equal to zero for any value of $\theta$. In other words, the output signal I'(t) can be obtained for any polarization state of the signal lightwave.

Figure 4:
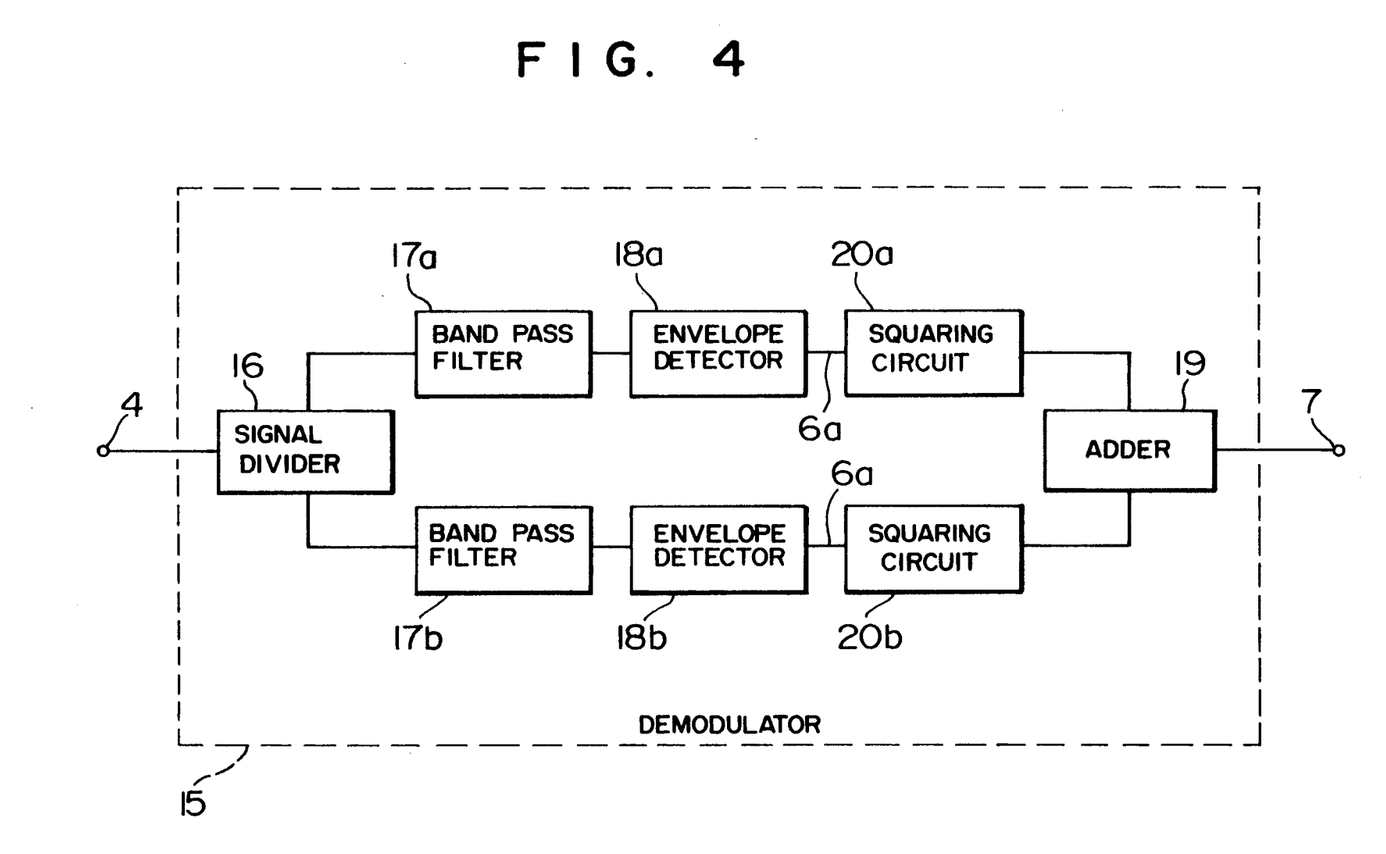
FIG. 4 is a block diagram showing a modified version of the demodulator 15 of FIG. 1.

FIG. 4 shows a modified version of the demodulator 15. In this modified version, the light intensity of the reference lightwave 1a is made substantially equal to that of the reference lightwave 1b, and the baseband signals 6a and 6b are substantially squared prior to the addition thereof. That is, squaring circuits 20a and 20b are connected to the input side of the adder 19. The above operations can be expressed by the following formulae:

$$E_{LOV} \approx E_{LOH} (= E_{LO}) \atop I'(t) \approx \{I_a'(t)\}^2 + \{I_b'(t)\}^2 \quad \Bigg\} \quad (5)$$

By inserting the equations (3) in the formulae (5), the output signal I'(t) is given by the following formula:

$$I'(t) \approx (D \cdot E_S \cdot E_{LO})^2 \quad (6)$$

The formula (6) indicates that, when the formulae (5) are satisfied, the output signal I'(t) is independent of $\theta$, that is, the output signal is constant for any polarization state of the signal lightwave. In other words, the power of the output signal is constant, independently of variations in polarization state of the signal lightwave. The first one of the formulae (5) can be satisfied by adjusting the driving current of at least one of the light sources 10a and 10b. Further, the second one of the formulae (5) can be satisfied, for example, by using a diode or field effect transistor in the squaring circuit. The present embodiment using this modified version can exhibit the same effect as obtained by the circuit configuration of FIG. 1, and can keep the power of output signal constant independently of variations in polarization state of the signal lightwave.

Figure 5:
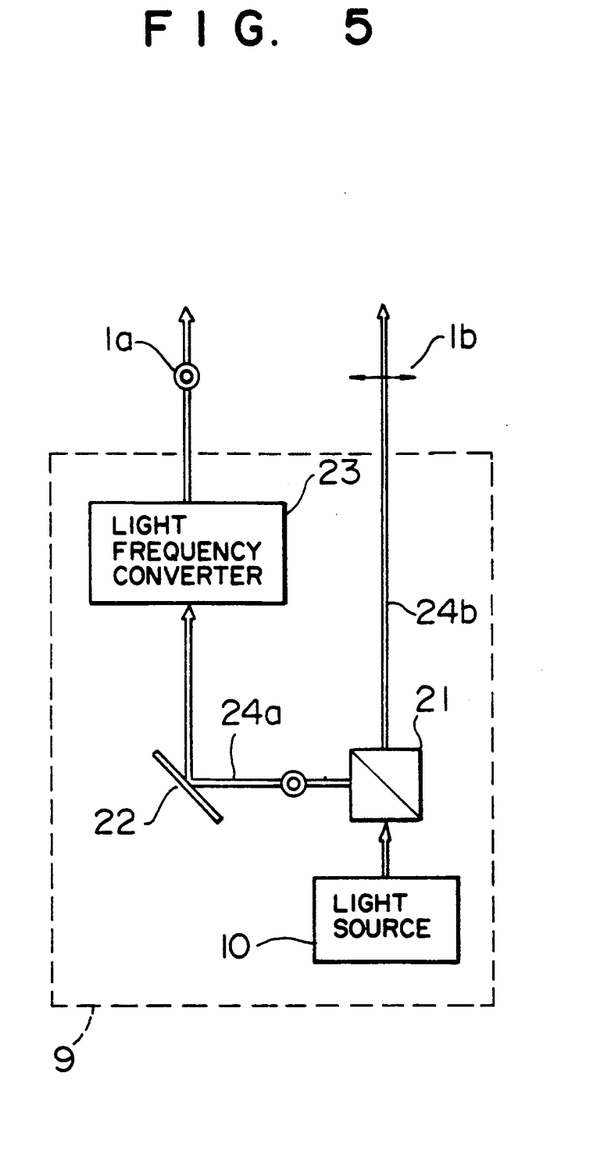
FIG. 5 is a block diagram showing a local oscillator which can be used in place of the local oscillator 9 of FIG. 1.

FIG. 5 shows another construction of the local oscillator 9 shown in FIG. 1. The local oscillator of FIG. 5 includes a single light source. In FIG. 5, reference numeral 10 designates a light source such as a semiconductor laser having a single oscillation mode, and 21 a polarization separator such as a polarization beam splitter. The lightwave emitted from the light source 10 is incident on the beam splitter 21, to be separated into two polarization components 24a and 24b whose polarization planes are substantially perpendicular to each other. Specifically, in a case where the output lightwave emitted from the light source 10 is linearly-polarized, and the light source 10 and the beam splitter 21 are arranged so that the polarization plane of the output lightwave of the light source 10 makes an angle of about 45° with one of the polarization axes of the beam splitter, the polarization components 24a and 24b becomes equal in light intensity to each other. Referring to FIG. 5, the polarization component 24a is reflected from a reflecting mirror 22, and is then incident on a light frequency converter 23, to have a frequency different from the frequency of the polarization component 21b. The frequency converter 23 can be formed of an acoustrooptic or electrooptic crystal. A light frequency converter formed of an acoustrooptic crystal is now available on the market. When the lightwave outputted from the frequency converter 23 is used as the reference lightwave 1a, and the polarization component 24b is used as the reference lightwave 1b, the local oscillator including only one light source 10 can perform the same function as the local oscillator of FIG. 1.

The present embodiment including the local oscillator of FIG. 5 can exhibit the same effect as obtained by the construction of FIG. 1, and moreover can halve the number of light sources. That is, the local oscillator of FIG. 5 can reduce the manufacturing cost of the present embodiment.

Figure 6:
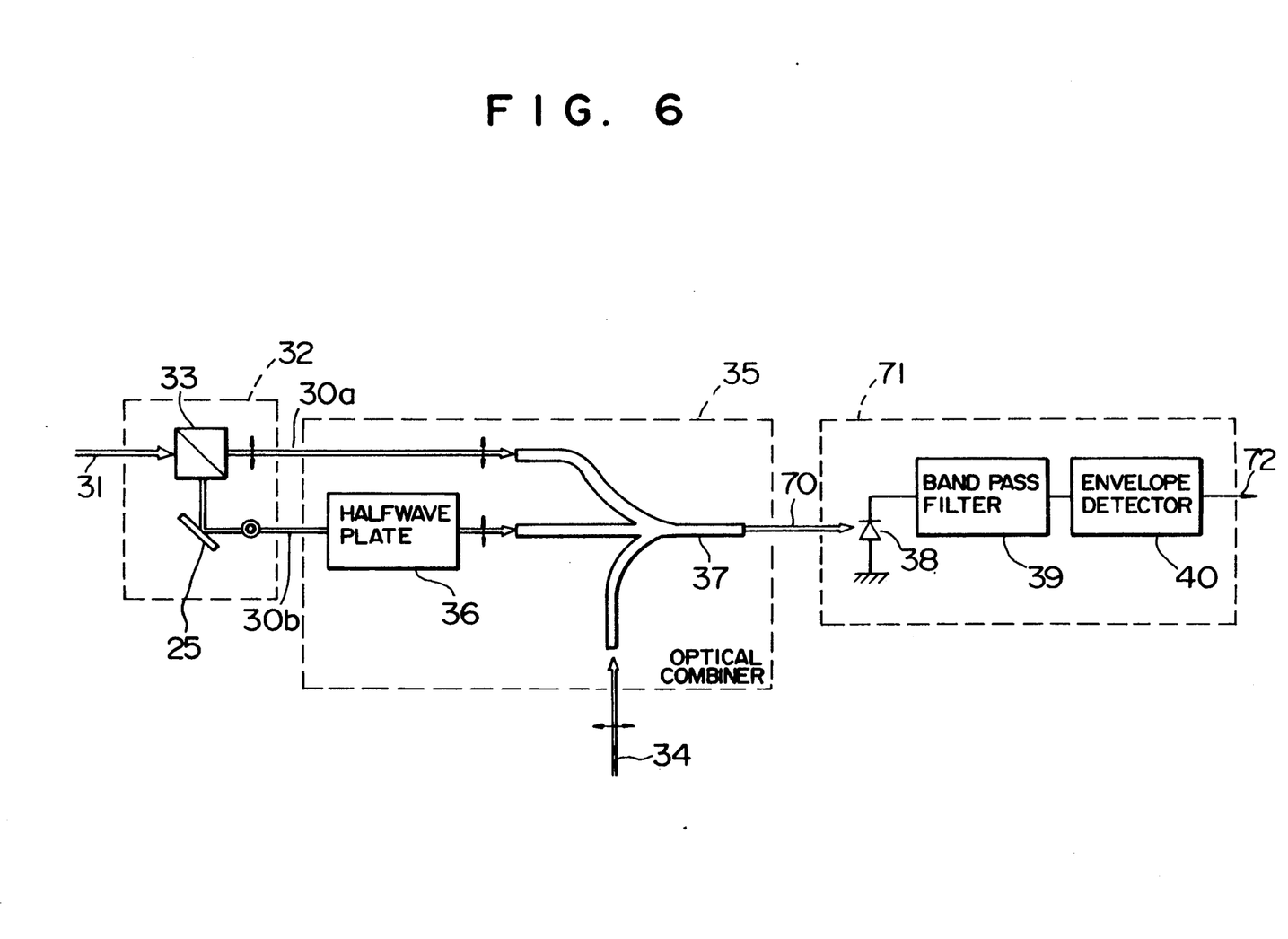
FIG. 6 is a block diagram showing another embodiment of a polarization-diversity optical receiving apparatus according to the present invention.

FIG. 6 shows another embodiment of a polarization-diversity optical receiving apparatus according to the present invention. In more detail, FIG. 6 shows a case where a signal lightwave 31 is a binary ASK (namely, binary amplitude shift keying) signal or binary FSK (namely, binary frequency shift keying) signal, and is subjected to heterodyne detection. In FIG. 6, reference numeral 33 designates polarization separator for separating the signal lightwave 31 into two polarization components whose polarization planes are perpendicular to each other (for example, a polarization beam splitter), 25 a reflecting mirror, 36 a polarization rotator (for example, a halfwave plate or a twisted polarization maintaining optical fiber), 37 an optical coupler (for example, an optical coupler of the single-mode optical fiber type), 38 an optical detector (for example, a PIN photodiode or an avalanche photodiode), 39 a bandpass filter, and 40 a demodulator for converting the output signal of the band pass filter 39 into a baseband signal (for example, an envelope detector). It is to be noted that the reflecting mirror 34 can be omitted by disposing the polarization rotator 36 and the optical coupler 37 appropriately.

Next, the operation of the present embodiment will be explained. Referring to FIG. 6, the signal lightwave 31 is separated by the polarization beam splitter 33 into two polarization components 30a and 30b whose polarization planes are perpendicular to each other. The polarization component 30a is incident on an input portion of the optical coupler 37, as it is. While, the polarization component 30b is reflected from the mirror 25, and is then incident on the polarization rotator 36, in which the polarization plane of the polarization component 30b is rotated through 90°. Thus, the polarization plane of the output lightwave of the rotator 36 is made parallel to the polarization plane of the polarization component 30a. The output lightwave of the converter 36 is incident on another input portion of the optical coupler 37. Further, a reference lightwave 34 is incident on a different input portion of the optical coupler 37 in a state that the polarization plane of the reference lightwave 34 is made parallel to the polarization plane of the polarization component 30a. Thus, three lightwaves 30a, 30b and 34 are combined in a state that respective polarization planes of these lightwaves are parallel to each other, and a combined lightwave 70 emerges from the optical coupler 37. The combined lightwave 70 is detected by the optical detector 38 which is included in a receiver 71, to be subjected to heterodyne detection. In a case where the signal lightwave 31 is a binary ASK signal, all signal components outputted from the optical detector 38 pass through the bandpass filter 39. In a case where the signal lightwave 31 is a binary FSK signal, either of "space" signal component or "mark" signal component included in the output signal of the optical detector 38 pass through the bandpass filter 39. As a result, a binary electrical ASK signal is delivered from the bandpass filter 39. The output signal of the bandpass filter 39 is converted by the envelope detector 40 into a baseband signal, and thus a demodulated signal 72 is obtained. As mentioned above, the signal lightwave 31 is separated into two polarization components whose polarization planes are perpendicular to each other, and then the polarization components and a reference lightwave are combined in a state that the polarization planes of these components and lightwave are made parallel to each other, to form a combined lightwave incident on the optical detector 38. Hence, the demodulated signal 72 can be obtained for any polarization state of the signal lightwave 31.

The present embodiment is simpler in construction than the embodiment of FIG. 1.

Figure 7A:
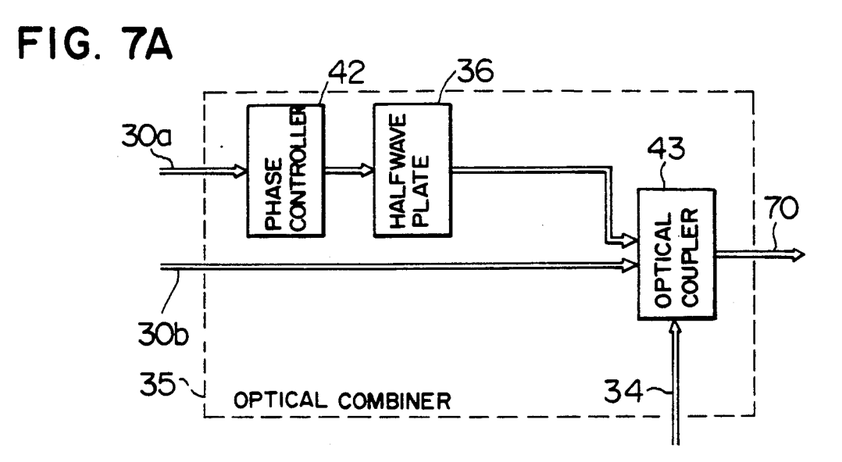
FIGS. 7A to 7C are block diagrams showing examples of the optical combiner 35 of FIG. 6.
Figure 7B:
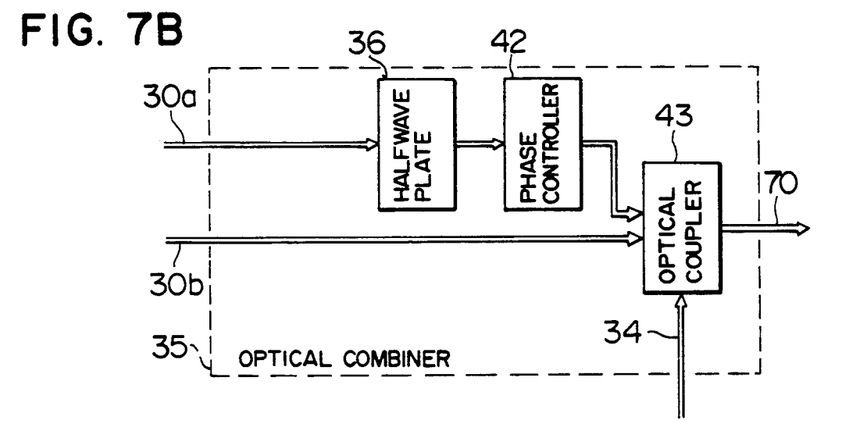
Figure 7C:
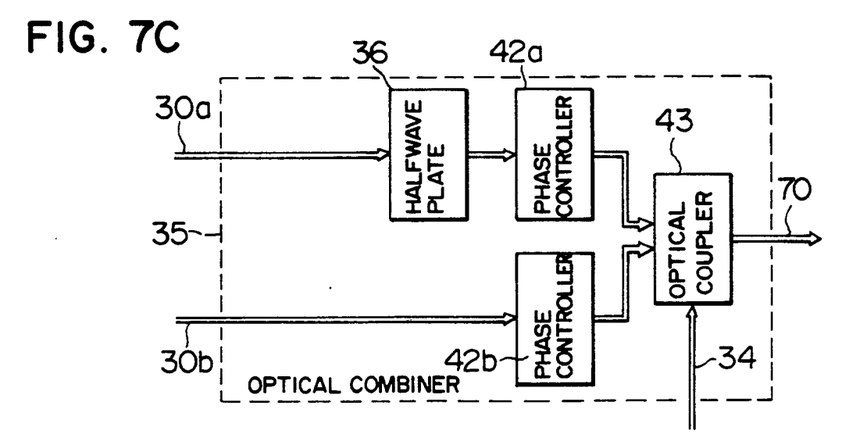

FIGS. 7A to 7C show examples of the optical combiner 35 of FIG. 6. In these examples, either or both of the phases of the polarization components 30a and 30b are controlled. In FIGS. 7A to 7C, reference numeral 36 designates a polarization rotator, 42 a phase controller, and 43 an optical coupler. An electrooptic crystal whose refractive index can be controlled by an applied voltage, or a semiconductor phase controller whose refractive index can be controlled by an injection current, is used as the phase controller 42. FIG. 7A shows a case where the phase of the polarization component 30a is controlled before the polarization plane thereof is controlled by the polarization rotator 36. FIG. 7B shows a case where the phase of the polarization component 30a is controlled after the polarization plane thereof has been rotated. FIG. 7C shows a case where the phases of the polarization components 30a and 30b are both controlled.

Further, the phase controller 42 may be included in an optical combiner having a structure other than the structures of FIGS. 7A to 7C so that the polarization components 30a and 30b contained in the combined lightwave 70 are in phase. The polarization rotator 36 of FIGS. 7A to 7C is the same as explained with reference to FIG. 6, and the optical coupler 43 can be formed of the optical coupler 37 of FIG. 6. When the optical combiner 35 shown in one of FIGS. 7A to 7C is used, the combined lightwave 70 contains the polarization components 30a and 30b in a state that the components 30a and 30b are in phase, and hence the detection efficiency is improved.

Figure 8:
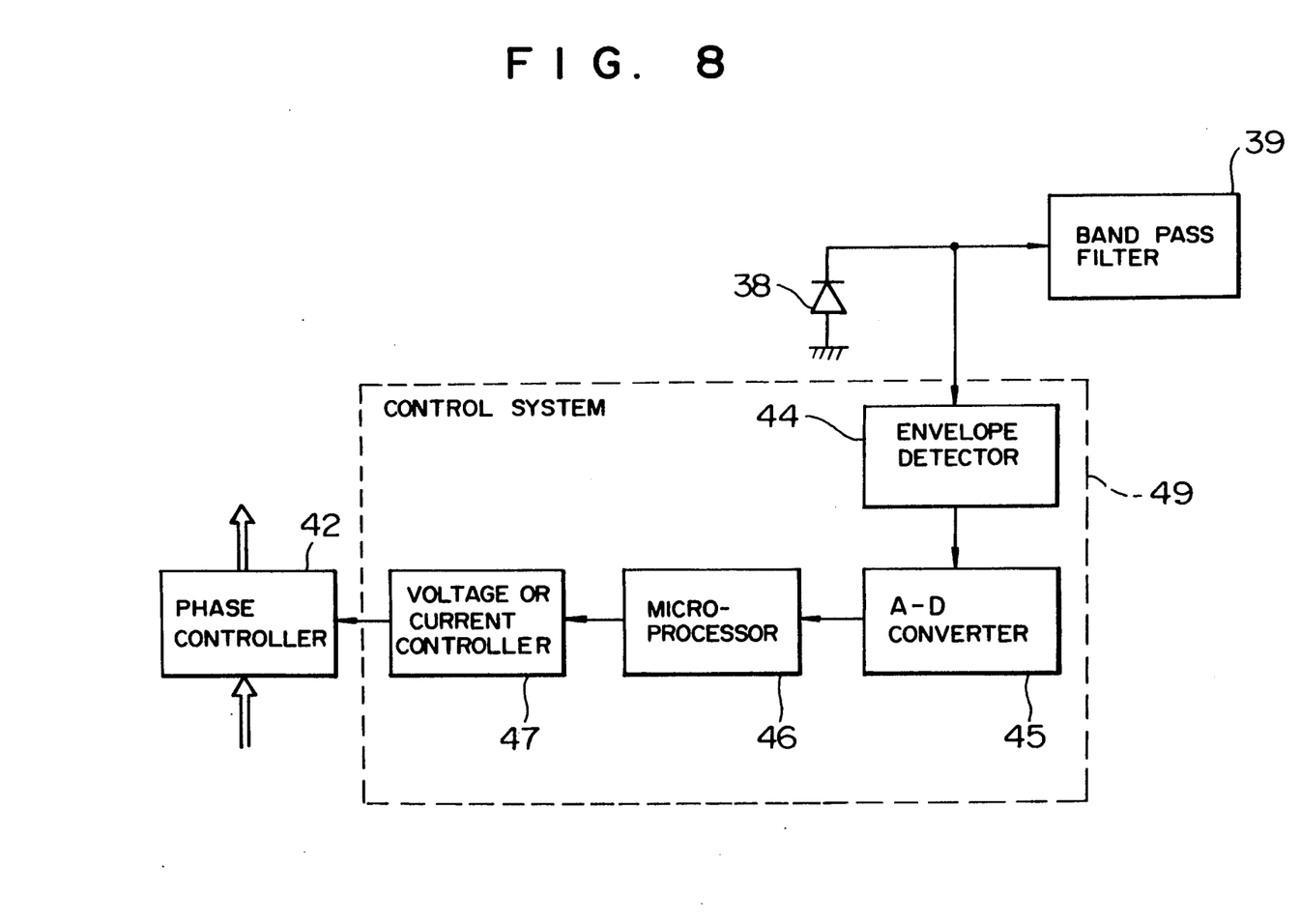
FIG. 8 block diagram showing a circuit for controlling the phase controller 42 of FIG. 7.

In a case where the phase of a polarization component is controlled by the phase controller 42, a control method utilizing a modern control theory (that is, maximum seeking automatic control method) is employed, which is described in, for example, a paper entitled "Proposal for Automatic Polarization Control System in Coherent Optical Communication" by N. Yoshida et al. (Reports of the group of optical communication theory, Institute of Electronics and Communication Engineers of Japan, OCT 86–15, Aug. 27 1986, pages 25 to 27). According to the above paper, part of the output signal of the optical detector 38 is subjected to envelope detection, and a voltage applied to or a current supplied to the phase controller 42 is controlled so that the signal having been subjected to the envelope detection becomes maximum. Thus, the phase of the polarization component 30a can be made substantially equal to that of the polarization component 30b. FIG. 8 shows an example of a control system for performing the above control operation. As shown in FIG. 8, a control system 49 includes an envelope detector 44, an analog-to-digital converter 45, a microprocessor 46 and a voltage or current controller 47 which are connected in series. Further, the envelope detector 44 is connected to the output side of the optical detector 38, and the phase controller 42 is connected to the controller 47, to be controlled by the control system 49.

As mentioned above, the polarization-diversity optical receiving method and apparatus according to the present invention have the following advantages. A polarization separator which attenuates a signal lightwave, is not included in the embodiment of FIG. 1, and hence the sensitivity of the embodiment is improved. Unlike the prior art which employs a pair of optical combiners, the present invention requires only a single optical combiner, and hence can reduce the manufacturing cost of a polarization-diversity optical receiving apparatus. Unlike the prior art which requires a pair of optical receivers, a pair of electric circuit each connected to a corresponding one of the optical receivers, and a pair of optical element, the present invention requires only a single optical receiver, electric circuit and optical element, and hence can not only make a polarization-diversity optical receiving apparatus small in size and low in manufacturing cost but also can reduce the power consumption and operating cost of the optical receiving apparatus. Further, the present invention can reduce the amount of heat generated in the optical receiving apparatus, and thus can reduce the cooling cost for cooling the light receiving apparatus. Unlike the prior art which is required to select two optical receivers having the same characteristics from a multiplicity of optical receivers, the present invention employs only a single optical receiver, and is not required to make the above selection. Hence, the present invention can reduce the manufacturing cost of the optical receiving apparatus.

Figure 9:
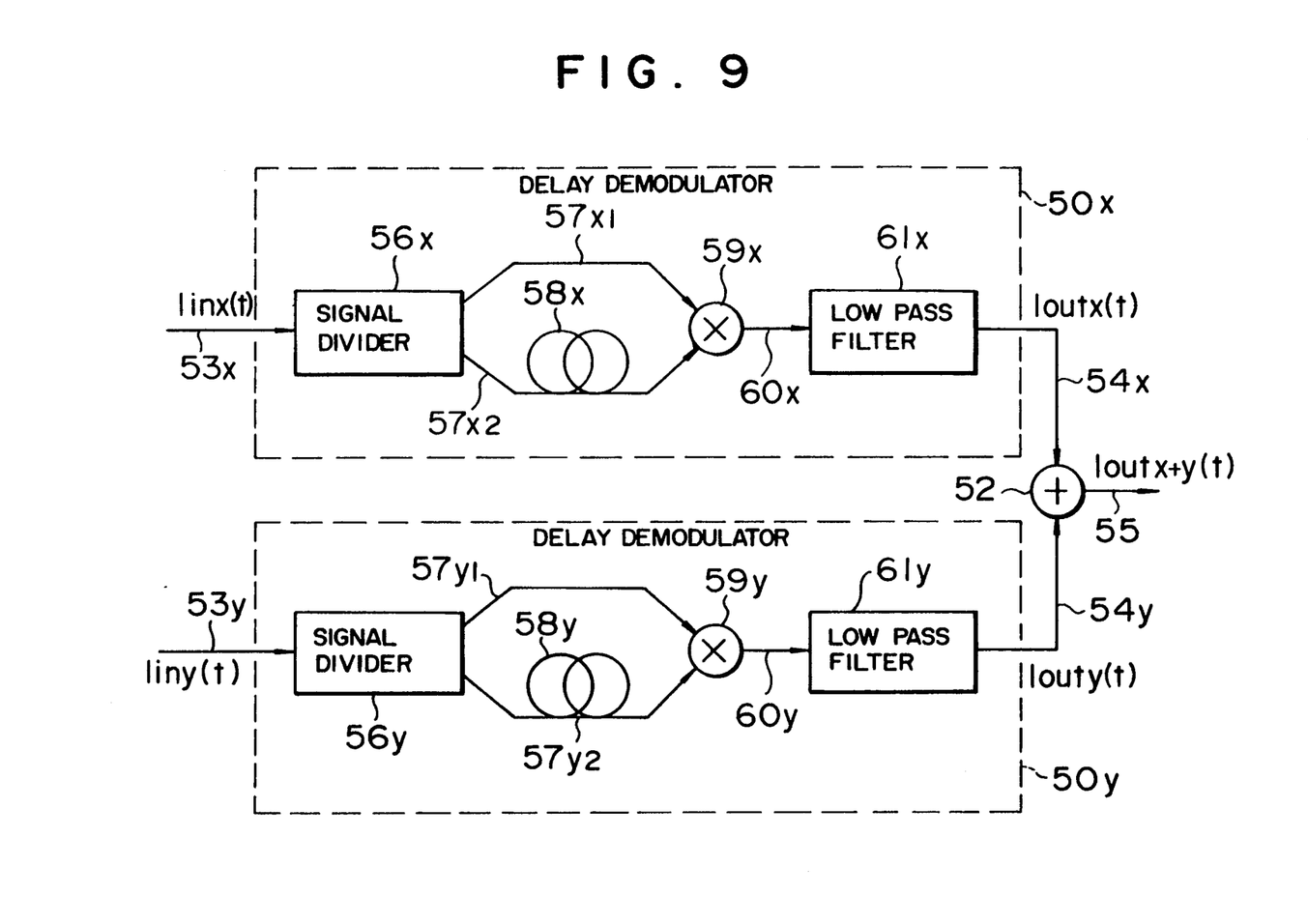
FIG. 9 is a block diagram showing a demodulator which is suitable for use in the embodiment of FIG. 1.

FIG. 9 shows a demodulator which is suitable for use in the embodiment of FIG. 1. In FIG. 9, reference symbols 50x and 50y designate delay demodulators, 52 an adder, 53x and 53y intermediate-frequency signals which are obtained by carrying out heterodyne detection for two polarization components of signal lightwave having polarization planes perpendicular to each other, and are applied to the delay demodulators 50x and 50y, 54x and 54y output signals of the delay demodulators 50x and 50y, and 55 a signal obtained by adding the output signals 54x and 54y.

Referring to FIG. 9, each of the delay demodulators 50x and 50y includes a signal divider 56x or 56y, a delay line 58x or 58y, a multiplier 59x or 59y, and a low pass filter 61x or 61y. Each of the multipliers 59x and 59y can be formed of a double balanced mixer or the like. Incidentally, reference symbols 57x1 and 57x2 designate signal portions divided by the signal divided 56x, 57y1 and 57y2 signal portions divided by the signal divided 56y, 60x the output of the multiplier 59x, and 60y the output of the multiplier 59y.

Now, the operation of the demodulator of FIG. 9 for the intermediate-frequency signal 53x will be explained below, by way of example.

The intermediate-frequency signal 53 is divided by the signal divider 56x into two signal portions 57x1 and 57x2. The signal portion 57x2 is delayed by the delay line 58x. Thus, a difference in delay time τ is produced between the signal portions 57x1 and 57x2 applied to the multipler 59x. Any delay means capable of generating an appropriate difference in delay time τ between the signal portions 57x1 and 57x2, can be used in place of the delay line 58x. The output 60x of the multiplier 59x contains a first signal component having a frequency equal to the sum of the frequencies of the signal portions 57x1 and 57x2, and a second signal component having a frequency equal to the difference between the frequencies of the signal portions 57x1 and 57x2 (baseband signal). The first signal component is removed by the low pass filter 61x, and thus the output signal 54x of the low pass filter 61x contains only the second signal component. The output signal 54x thus obtained is added to the output signal 54*y* of the low pass filter 61*y* by the adder 52, to obtain the signal 55 from the adder 52.

As mentioned above, each of the delay demodulators 50*x* and 50*y* includes only the signal divider, the delay line, the multiplier and the low pass filter, and hence can be made small in size and low in cost. A demodulator similar to the demodulator of FIG. 9 is described in a paper entitled "Polarization Independent Coherent Optical Receiver" by B. Glance (JOURNAL OF LIGHTWAVE TECHNOLOGY, Vol. LT-5, No. 2, February 1987).

The demodulator of FIG. 9 can be modified so that the low pass filter 61*x* and 61*y* are removed from the delay demodulators 50*x* and 50*y*, to add the output signals 60*x* and 60*y* of the multipliers 59*x* and 59*y* by the adder 52, and the output of the adder 52 is applied to a low pass filter.

Figure 10:
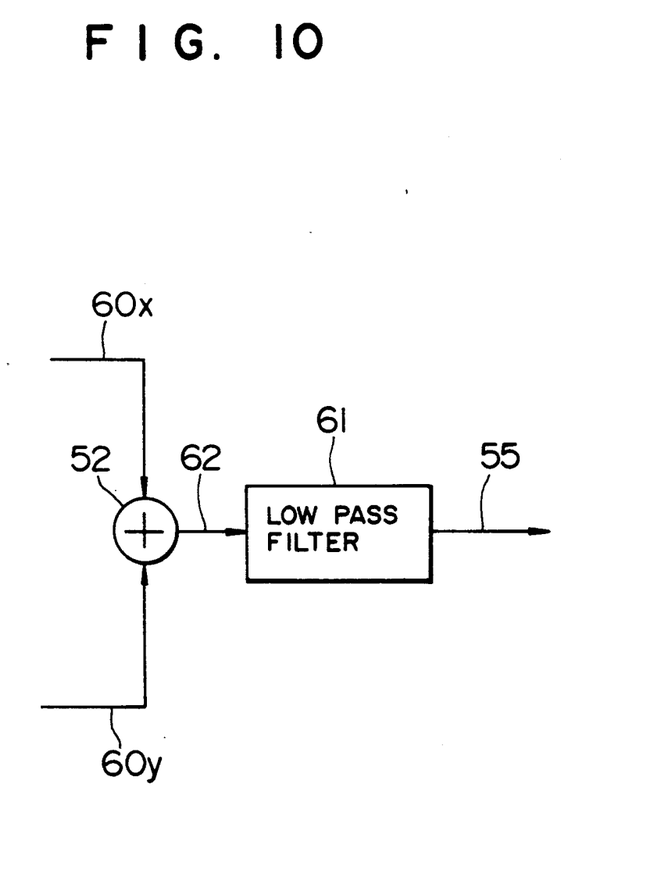
FIG. 10 is a block diagram showing part of a modified version of the demodulator of FIG. 9.

FIG. 10 shows part of a modified version of the demodulator of FIG. 9. In FIG. 10, reference symbol 62 designates a signal which is obtained by adding the output signals 60*x* and 60*y*, and contains both of the first and second signal components delivered from each of the multipliers 59*x* and 59*y*, and 61 a low pass filter. The first signal components contained in the signal 62 are removed by the low pass filter 61. Thus, the same signal as the signal 55 of FIG. 9 is obtained from the low pass filter 61. The demodulator of FIG. 10 is simpler in circuit configuration, smaller in size and lower in manufacturing cost than the demodulator of FIG. 9.

We claim:

1. An optical receiving method utilizing polarization diversity, comprising the steps of:
    combining first and second reference lightwaves with a signal lightwave to form a combined lightwave, the first and second reference lightwaves being different in frequency from each other, respective polarization planes of the first and second reference lightwaves being substantially perpendicular to each other;
    carrying out heterodyne detection for the combined lightwave to obtain a detection signal;
    separating the detection signal into first and second intermediate-frequency signals, the carrier frequency of the first intermediate-frequency signal being different from the carrier frequency of the second intermediate-frequency signal;
    converting the first and second intermediate-frequency signals into first and second baseband signals, respectively; and
    adding the first and second baseband signals, to obtain an output signal.

2. An optical receiving method according to claim 1, wherein the first and second reference lightwaves are made substantially equal in light intensity to each other, and the first and second baseband signals are substantially squared before the first and second baseband signals are added.

3. An optical receiving method according to claim 2, wherein the first and second reference lightwaves are formed by separating a lightwave, which is emitted from a semiconductor laser having a single oscillation mode, into two polarized light components, and by carrying out frequency conversion for at least one of the polarized light components.

4. An optical receiving method according to claim 1, wherein the first and second reference lightwaves are formed by separating a lightwave which is emitted from a semiconductor laser having a single oscillation mode, into two polarized light components, and by carrying out frequency conversion for at least one of the polarized light components.

5. An optical receiving method according to claim 1, wherein the first and second reference lightwaves are emitted from first and second semiconductor lasers, respectively.

6. An optical receiving method according to claim 1, wherein the conversions from the first and second intermediate-frequency signals into the first and second baseband signals are carried out by envelope detectors.

7. An optical receiving method according to claim 6, wherein the first and second intermediate-frequency signals are converted into the first and second baseband signals by demodulators with square-law characteristics.

8. An optical receiving method according to claim 1, wherein the conversions from the first and second intermediate-frequency signals into the first and second baseband signals are carried out by delay demodulators.

9. An optical receiving apparatus utilizing polarization diversity, comprising:
    means for emitting first and second reference lightwaves so that respective polarization planes of the first and second reference lightwaves are substantially perpendicular to each other, the first and second reference lightwaves being different in frequency from each other;
    means for combining the first and second reference lightwaves with a signal lightwave to form a combined lightwave;
    means for carrying out heterodyne detection for the combined lightwave to obtain a detection signal;
    means for separating the detection signal into first and second intermediate-frequency signals, the carrier frequency of the first intermediate-frequency signal being different from the carrier frequency of the second intermediate-frequency signal;
    means for converting the first and second intermediate-frequency signals into first and second baseband signals, respectively; and
    means for adding the first and second baseband signals.

10. An optical receiving method utilizing polarization diversity, comprising the steps of:
    separating a signal lightwave into two polarized light components, respective polarization planes of the polarized light components being substantially perpendicular to each other;
    combining the polarized light components with a reference lightwave such that respective polarization planes of the polarized light components and the reference lightwave are made substantially parallel to each other, to form a combined lightwave; and
    carrying out one of heterodyne detection and homodyne detection for the combined lightwave to obtain a demodulated signal.

11. An optical receiving apparatus utilizing polarization diversity, comprising:
    means for separating a signal lightwave into two polarized light components, respective polarization planes of the polarized light components being substantially perpendicular to each other;
    means for combining the polarized light components with a reference lightwave such that respective polarization planes of the polarized light components and the reference lightwave are made substantially parallel to each other, to form a combined lightwave; and means for carrying out one of heterodyne detection and homodyne detection for the combined lightwave to obtain a demodulated signal.

12. An optical receiving apparatus utilizing polarization diversity, comprising:

means for combining first and second reference lightwaves with a signal lightwave to form a combined lightwave, the first and second reference lightwaves being different in frequency from each other, respective polarization planes of the first and second reference lightwaves being substantially perpendicular to each other;

means for carrying out heterodyne detection for the combined lightwave to obtain a detection signal, the detection signal comprising first and second intermediate-frequency signals with different carrier frequencies, the first and second intermediate-frequency signals being caused by first and second polarization components of the signal lightwave, respectively;

means for converting the detection signal into two baseband signals; and means for adding said two baseband signals to obtain an output signal.

13. An optical receiving apparatus according to claim 12, wherein said converting means includes delay demodulation means which carries out delay demodulation for each of two intermediate-frequency signals to obtain two baseband signals, the intermediate-frequency signals being obtained by carrying out heterodyne detection for two polarization components of a signal lightwave, respective polarization planes of the polarized light components being substantially perpendicular to each other.

* * * * *